US007890919B1

(12) United States Patent
Williams (10) Patent No.: US 7,890,919 B1
(45) Date of Patent: Feb. 15, 2011

(54) AUTOMATIC COMPONENT UPDATE AND INTEGRATION

(75) Inventor: Heidi Bauer Williams, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1507 days.

(21) Appl. No.: 10/975,036

(22) Filed: Oct. 27, 2004

(51) Int. Cl.
*G06F 9/44* (2006.01)

(52) U.S. Cl. .................. 717/100; 717/102; 717/113; 717/168

(58) Field of Classification Search .................. None
See application file for complete search history.

(56) References Cited

U.S. PATENT DOCUMENTS

| 2004/0133873 | A1* | 7/2004 | Dan et al. | 717/100 |
| 2004/0158811 | A1* | 8/2004 | Guthrie et al. | 717/103 |
| 2004/0177335 | A1* | 9/2004 | Beisiegel et al. | 717/102 |
| 2005/0273758 | A1* | 12/2005 | Long | 717/101 |

OTHER PUBLICATIONS

"Forte for Java (Community Edition) User's Guide", Sun Microsystems, Inc., Dec. 2000, pp. 1-22. Online retrieved at <http://www-camden.rutgers.edu/HELP/Documentation/Sun-compiler-docs>.*
"Inside ASP.NET Web Matrix", Homer et al., published 2002, <hesab.net/book/vb.net/web%20matrix_doc.pdf>.*
"Introducing collaboration into an application development environment", Hupfer et al., Nov. 2004, pp. 21-24, <http://delivery.acm.org/10.1145/1040000/1031611/p21-hupfer.pdf>.*
"A language development environment for Eclipse", Van Den Brand et al., Dec. 2003, pp. 55-59, <http://delivery.acm.org/10.1145/970000/965672/p55-van_den_brand.pdf>.*

* cited by examiner

*Primary Examiner*—Thuy Dao
(74) *Attorney, Agent, or Firm*—Kilpatrick Stockton LLP (57) ABSTRACT

An application development environment is described that updates one or more component tools offered in the application development environment. The application development environment determines the address of a server site related to the application under edit. After accessing this server site, the application development environment searches for one or more components related to the application being edited. The application development environment downloads and compares the server site components with one or more local components associated with the application. If a difference is detected, and a user authorizes the update, the application development environment revises the local components with the downloaded components and updates the component tools to facilitate presentation of the new components to the developer.

43 Claims, 10 Drawing Sheets

AUTOMATIC COMPONENT UPDATE AND INTEGRATION

TECHNICAL FIELD

The present invention relates, in general, to application development environments and, more specifically, to an automatic update and integration of software components.

BACKGROUND OF THE INVENTION

Over the last ten years, computers and computing technology have grown tremendously due, in no small part, to the growth and reach of the Internet. Computer applications, once delivered on a disk in some kind of marketing package, are now available and even operable over the Internet. These Internet applications allow consumers to take advantage of the logic behind the application without buying the software for installation on a local computer. The prevalence of Internet connections has also allowed developers to create automatic updating features for computer applications. As such applications are started up, an update feature will typically establish a connection with a remote server over the Internet to search for any updates to the code or features of the application and download those to the application. The user may then execute the update file and restart the application once the update file has finished updating the application. Application development, as a consequence, now encompasses not only building or coding stand-alone software applications that users can buy on disk or download from a remote server, but also developing Internet-active applications that can either run on a client machine and check for updates and/or other information via the Internet or run on a remote server, while serving their logic to client users over the Internet. Application development environments have also evolved correspondingly to account for the development process including such interactions with remote servers.

Programming techniques have also evolved during the growth of computing technology. Modular programming techniques, such as Object Oriented Programming (OOP), have been developed that encourages reuse and/or interchange of pieces of software between or within programs. Self-sufficient modules may be created that contain the data and processing and then formed as objects within the program. Thus, a developer would spend the time to develop the module or class once and then be able to use it in various instances throughout one or a number of programs. One such modular concept is the use of components for developing interactive applications.

Components are modular pieces of software that have a variable set of parameters that allows a developer to change the appearance and/or function of the component object at runtime. Application development environments such as MACROMEDIA INC.'s MACROMEDIA FLASHMX™, MACROMEDIA INC.'s DREAMWEAVER™, and the like, include various pre-built components that developers may use in building various applications. The components generally include parameters that the developer may set in order to customize the application of the component as desired by the developer. By using components, developers may save considerable time creating complex applications. Components include items such as interface controls, including radio buttons, check boxes, input fields, scroll bars, and the like; data components, which allow loading and manipulating information from data sources; media components, that allow playback and control of streaming media; manager components, that allow managing non-visual components such as focus or depth, popups, styles, and the like; as well as various other program elements.

Application development environments that utilize components typically provide various interface elements to the developer in order to assist him or her in deploying components more easily. Insert bars, code hinting, and tag or component inspectors are each examples of different interface elements that some application development environments may provide to facilitate the use of components. An insert bar is typically a toolbar that displays icons or buttons corresponding to the available components. When the developer selects the icon that corresponds to the desired component, the application development environment creates an instance of the component and places it in the editing region.

Application development environments typically employ one or both of a code view edit mode, in which the actual code or script is presented to the user for text-editing, a design view mode, in which the code of the underlying application is rendered to the developer as it would be rendered in operation (e.g., a Hypertext Markup Language (HTML) page being rendered in a Web browser). In the design view mode, the developers generally graphically manipulate the application as rendered on the display. When the application development environment inserts the component selected, it will place the component in which ever edit mode the developer is using. The developer would then be able to manipulate the position and parameters of the component to fit it within the application being developed. Therefore, in order to properly display the component on the design view canvas, the application development environment typically has access to the visual representation of the component. In existing application development environments, only the visual representation of standard or built-in components are available. Any components that are design by the user or other individual developers will not be available for visual rendering in the design view surface or canvas of the application development environment. Thus, existing application development environments typically cannot display user-created components on the design view surface or canvas.

Code hinting is a help feature that is used by many application development environments in a code view editing mode. As the user types code, a popup box appears near the insertion point that lists possible code, components, or application programming interface (API) methods or commands associated with the input typed by the developer. The developer may then scroll through the list and pick the specific component, tag, method, or the like from the displayed list instead of typing the desired information to completion. Again, as the developer makes the particular selection, the application development environment inserts the code and/or visual rendering of the component or object in the edit region.

Tag or component inspectors are a version of a property inspector that is directed specifically to programming tags or commands rather than the properties of an object. A tag or component inspector is typically a visual interface element that presents the available information on a highlighted tag or piece of code. It generally lists the properties, settings, elements, and the like of the highlighted code and also usually provides an edit interface that allows the developer to edit the code from within the tag inspector rather than in the code view or design view of the editing region. For example, a developer may highlight a button component tag, which causes the properties of the button component to appear on the tag inspector. If the developer desired to modify the shape or color of the button component, he or she could manipulate the color and/or shape properties directly in the tag inspector
} interface. As the user updates the properties in the tag inspector, the editing region updates to reflect either the updated code or re-renders to the updated visual representation of the component.

Many application development environments also allow users and developers to create their own components. The developers may save these customized components along with the pre-existing components for use in future projects. However, application development environments generally cannot include the user-defined custom components in the various component interfaces, such as the insert bar, code hinting, and tag inspectors. Moreover, the user-defined custom components cannot be displayed on the design view canvas or surface. These component interfaces and the design view canvas are typically limited to the objects that are defined by the manufacturer before each version of the software ships. Therefore, developers would have little opportunity to modify the source or object code of the application development environment. Moreover, once the application has been manufactured and shipped, new components developed by third parties or the manufacturer itself typically may not be updated into the component interface until any subsequent software version release.

BRIEF SUMMARY OF THE INVENTION

The present invention is directed to a system and method for updating components and component tools within an application development environment. When a developer opens an application for editing in an application development environment, the application development environment determines a server site that is connected with the application under edit. The application development environment accesses that server site over the Internet, local area network (LAN), wide area network (WAN), or the like and searches for any components or component archives that maybe compatible or associated with the application under edit. The application development environment downloads copies of these components or component archives to the developer's local computer.

The downloaded components are compared against the local components to determine whether or not there are any differences. If differences are detected, the developer may select to update the local components with the downloaded components. Using the downloaded components, the application development environment updates any of the component tools to reflect the updated components. Within this process, the application development environment generates component information files from the downloaded components that may be used by the component tools to present the component functionality to the developer.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
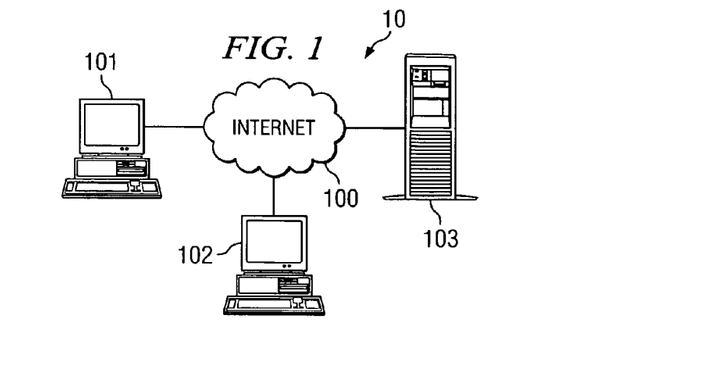
FIG. 1 is a block diagram illustrating a component update system operable according to one embodiment of the present invention.

FIG. 1 is a block diagram illustrating component update system 10 operable according to one embodiment of the present invention. Client computer 101 is a general purpose, personal computer having a connection to Internet 100. A user of client computer 101 runs an application development environment that utilizes components and offers component interfaces to facilitate their use. An example of such an application development environment is MACROMEDIA FLASH MX™, DREAMWEAVER™, MACROMEDIA INC.'s FLEX BUILDER™, and the like. As the user starts the application development environment on client computer 101, a connection with remote server 103 is established over Internet 100. The code for the application development environment includes the address of remote server 103 in addition to the paths in which application components are located.

After the application development environment connects with remote server 103 and finds the various component archives or component files in the class paths, it downloads the components on remote server 103 defined for the application development environment into a temporary location on client computer 101. It then compares the downloaded components to the components available locally on client computer 101. If the application development environment discovers new components or determines that any of the components have been deleted or modified, the a dialog box is presented to the user informing the user of the discovered components and requesting to load the components from remote server 103 into the application development environment running on client computer 101. If the user selects to replace the local components with the downloaded components, the application server copies all of the components downloaded from remote server 103 into the component data structure, thus, completely replacing the set of components operable on the application development environment.

As the application development environment replaces the component set, it also updates any available component interfaces, such as insert bars, code hinting, component inspectors, or the like, with the information about the newly downloaded components. Therefore, as the user continues working with application development environment, any component interface elements available to the user will be populated with the new or modified components for use in developing the various applications. The update process occurs at runtime, such that the user is not required to re-start the application in order to install the downloaded components.

Remote server 103 may be a server provided by the manufacturer of the application development environment, or may be a server maintained by another user or third party. If provided by a third party, the application development environment may have the capability to accept user input of the address for such third party servers along with the expected class paths for the components. Various individuals may create custom components to be loaded onto remote server 103. For example, a developer operating client computer 102 may develop one or more custom components that he or she wishes to share with the developer community. The developer would upload these custom components to remote server 103 via Internet 100 in the locations appropriate for components compatible with the application development environment. Therefore, when the user of client computer 101 starts the application development environment, he or she may be able to download custom components from remote server 103 that were created by the developer at client computer 102.

Figure 2A:
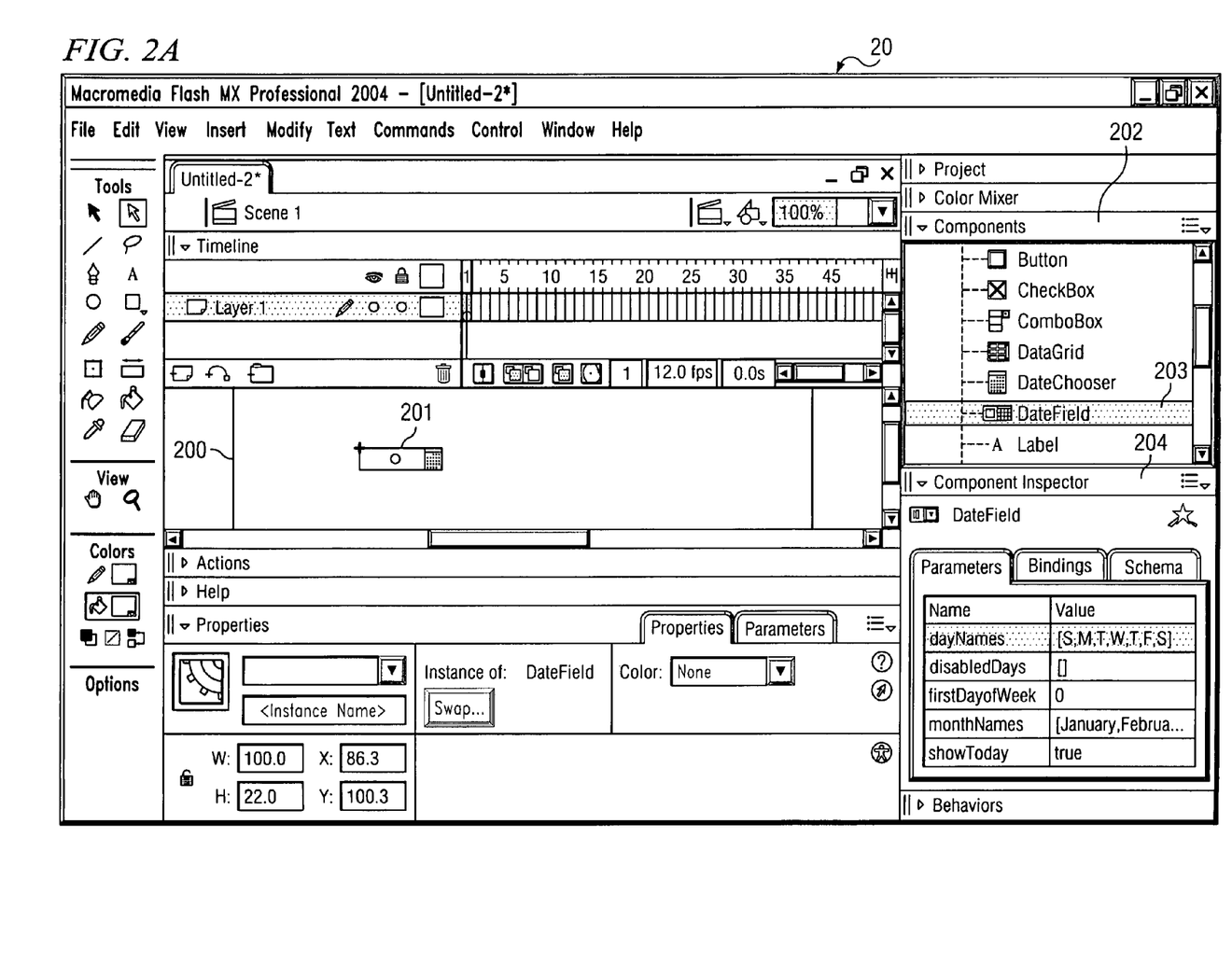
FIG. 2A is a screenshot of an application development environment configured according to one embodiment of the present invention.

FIG. 2A is a screenshot of application development environment 20 configured according to one embodiment of the present invention. For purposes of the example illustrated in FIG. 2A, client computer 101 (FIG. 1) operates application development environment 20. As the user starts application development environment 20, it accesses remote server 103 (FIG. 1) and finds a group of user interface (UI) components that are not already available on application development environment 20. The user is then asked whether to update the local components with the components from remote server 103. If the user decides to install the new components, the new UI components are displayed in component palette 202 and component inspector 204. When application development environment 20 loads the UI components, component palette 202 and component inspector 204 are updated with the information regarding the new UI components in order to populate these component interfaces with the new UI component functionality.

In the example illustrated in FIG. 2A, the developer has dragged DateField component 203 onto stage 200 for DateField component instance 201. Application development environment 20 is shown with a design view mode of editing stage 200. The developer's editing actions cause the visual representation of DateField component 203 to be presented as DateField component instance 201 on stage 200. The addition of DateField component 203 to application development environment 20 also includes adding the underlying code used to program the visual representation and functionality of DateField component 203. Thus, as the developer places DateField component instance 201 onto stage 200, the corresponding code is copied into the code defining the application being developed.

Figure 2B:
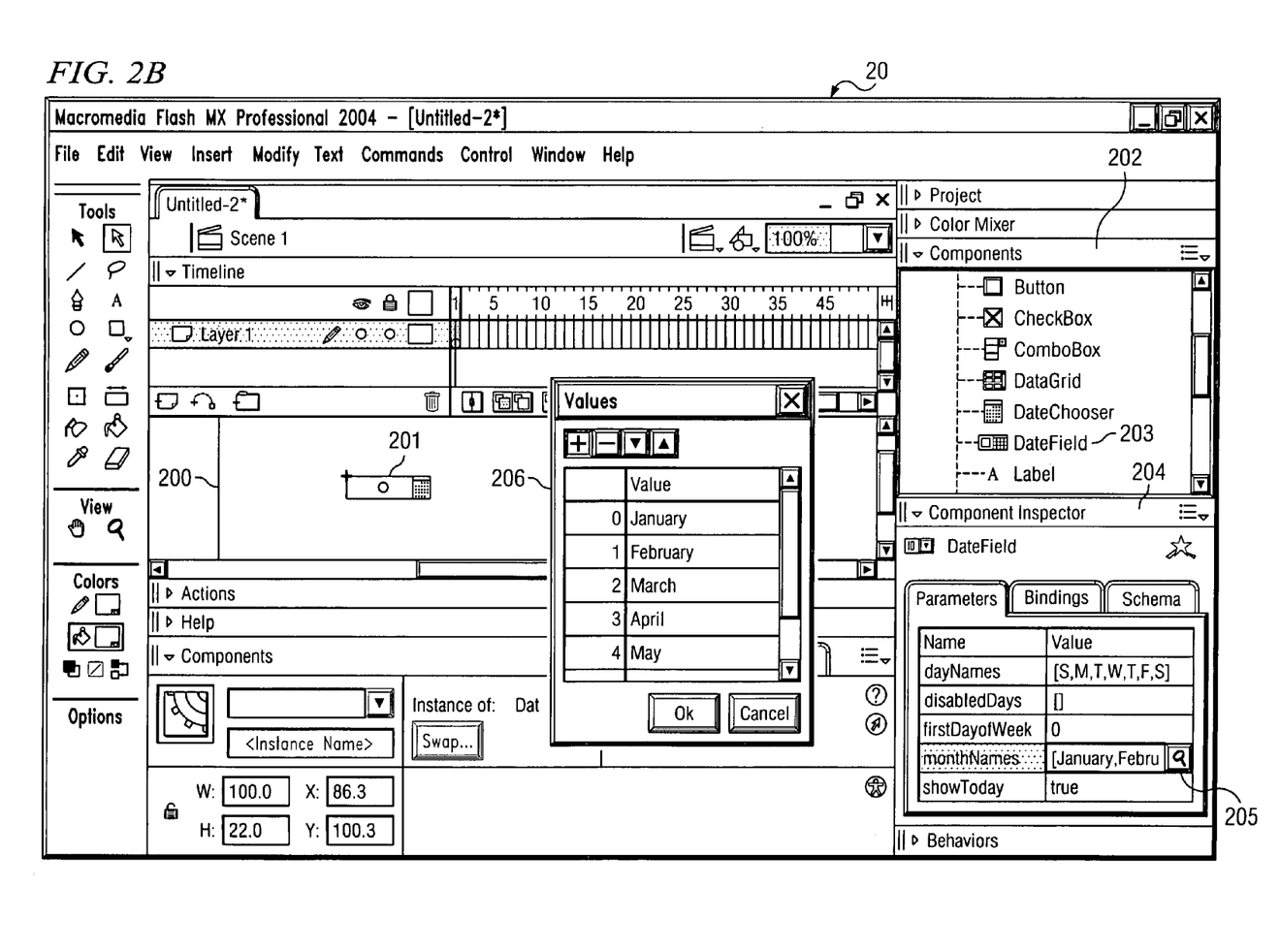
FIG. 2B is a screenshot illustrating an application development environment configured according to one embodiment of the present invention presenting a component inspector property dialog to a user.

FIG. 2B is a screenshot illustrating application development environment 20 configured according to one embodiment of the present invention presenting component inspector 204 property dialog 206 to a user. Part of the value of components is the ability to vary the parameters of the component in order to modify their appearance and behavior in their intended positions. As application development environment 20 downloads and installs the components from remote server 103 (FIG. 1), the component interfaces of application development environment 20 are populated with the structure and functionality of the installed components. Therefore, component inspector 204 includes representation of each component's parameters and attributes.

The developer is shown to have selected monthNames parameter 205 from component inspector 204. When this selection occurs, property dialog 206 is presented to the user that provides an interface for the user to modify the selected parameters of the component, DateField component instance 201. Thus, the component interface functionality of application development environment 20 is populated with the information regarding DateField component 203, such that component inspector 204 and, consequently, property dialog 206 is able to present the appropriate component parameters to the user for manipulation.

In the example illustrated in FIGS. 2A and 2B, application development environment 20 is shown to be the MACROMEDIA FLASH MX™ development environment. As such, the application developed within stage 200 is developed in an FLA file format, which is the native file format for the MACROMEDIA FLASH MX™ development environment. When the developer is ready to deploy the MACROMEDIA FLASH™ application, the FLA file is compiled into a Small Web File (SWF) format. A SWF is the movie clip that runs the MACROMEDIA FLASH™ application on an interactive multimedia runtime container, such as the MACROMEDIA FLASH™ PLAYER. MACROMEDIA FLASH™ components are compiled into SWF Component (SWC) files that may be loaded into the MACROMEDIA FLASH MX™ development environment and, thereafter, deployed and/or consumed by the resulting SWF applications. In practice, SWC files may be generated using MACROMEDIA FLASH MX™, FLEX BUILDER™, or even a MACROMEDIA FLEX™ server.

Figure 3:
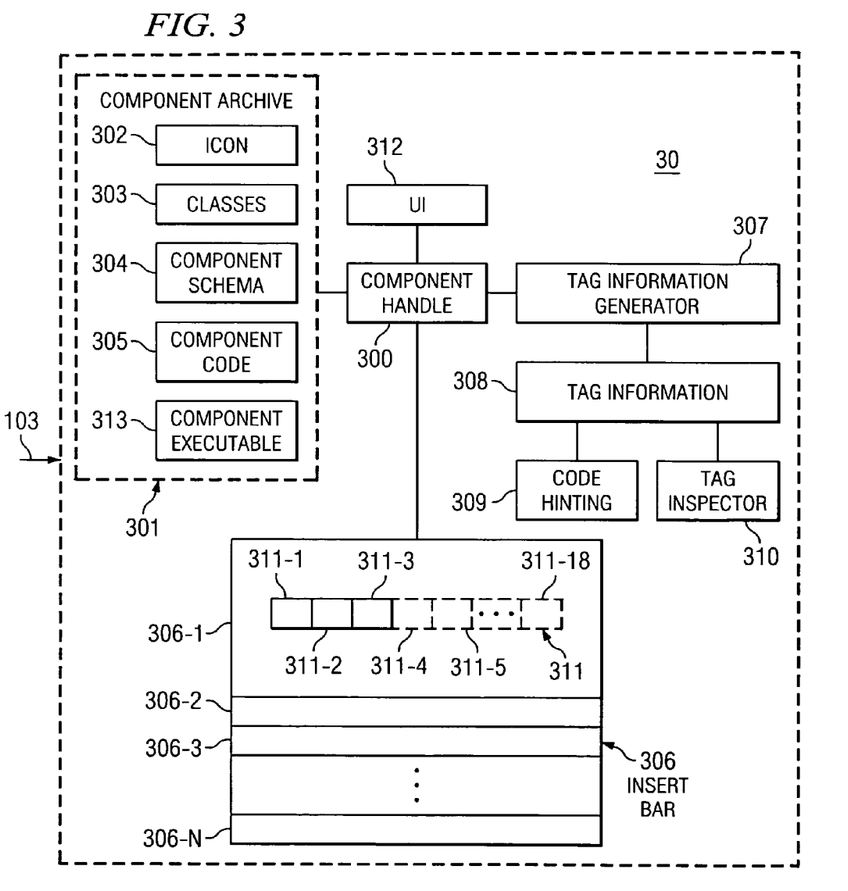
FIG. 3 is a block diagram illustrating an application development environment configured according to another embodiment of the present invention.

FIG. 3 is a block diagram illustrating application development environment 30 configured according to another embodiment of the present invention. Components downloaded from remote server 103 are downloaded as component archive (CAR) files, such as CAR 301. CAR 301 is a collection of related files that describe the relevant aspects of the underlying component or number of components. CAR 301 includes icon 302 that defines the graphic icon that is displayed on insert bar 306 or other location in which an iconic representation of the component is used. Classes 303 include the header files for the class, base classes, and other supporting classes used or consumed by the component. Depending on what type of component is defined by CAR 301, the classes may be SUN MICROSYSTEMS, INC's JAVA™ classes, MACROMEDIA, INC.'s ACTIONSCRIPT™ classes, MACROMEDIA MXML™ files, or the like.

Component schema 304 is a descriptive file that describes, in detail, the attributes and functionality of the component. Component schema 304 includes the particular class represented by the underlying component, it also includes what additional assets or tags that are used to instantiate the component, whether the component is visible in a design view mode of application development environment 30, the styles, events, effects, and properties of the component, any available information about the types of each property, including the possible values and any default values, whether the property can be databound to an outside source, any default events for triggering actions, and the like. CAR 301 also includes component code 305, which is the actual code that implements the underlying component. When the developer adds a component to an application, component code 305 is inserted into the code supporting the application under development.

CAR 301 also includes component executable 313. Component executable 313 is executable code, in either compiled format or un-compiled format, that is executed by user interface 312 in displaying the component in the design view canvas or surface. If component executable 313 is contained in un-compiled format, component handler 300 runs it through the compiler in application development environment 30. When operating in a design view editing mode, application development environment 30 uses component executable 313 to render and display the component.

It should be noted that many of the files making up CAR 301 are automatically generated by application development environment 30 as a developer creates a custom component. Such technology for generating the archive files is well-known in the art. For example, SWC files, which are component archive files native to MACROMEDIA FLASH™, FLEX™, and the like, may be generated for the developer in the MACROMEDIA FLASH™ development environment or the FLEX™ compiler. The component code, which may be written in ACTIONSCRIPT™, or the like, is processed by the MACROMEDIA FLASH™ development environment or the FLEX™ compiler, which creates the other archive files and packages the entire group into the SWC file.

In operation of application development environment 30, CAR 301 arrives from remote server 103. Component handler 300 processes CAR 301 into its various pieces and uses those pieces to populate the various component features and component interfaces offered by application development environment 30. Insert bar 306 is illustrated as a static array of nodes, 306-1-306-N. Nodes 306-2-306-N contains a static icon representation of the standard components offered by application development environment 30. The static array for insert bar 306 is usually created by the manufacturer of application development environment 30 prior to release of the application. Instead of remaining static, however, as was the case in prior application development environments, application development environment 30 defines dynamic array 311 within node 306-1 of insert bar 306. Thus, as new components are received from remote server 103, dynamic array 311 is supplemented with any new component icons in nodes 311-1-311-M.

Component handler 300 strips icon 302 from CAR 301 and adds it to one of the nodes of dynamic array 311, for example, node 311-1. therefore, when application development environment 30 updates user interface (UI) 312, the graphical interface for insert bar 306 is redrawn with the new component icon installed from node 311-1. Thus, the various embodiments of the present invention operate to make the static array defined for insert bar 306 dynamic.

Application development environment 30 also includes code hinting 309, which supplies code hints to a developer in the code view editing mode, and tag inspector 310, which supplies a visual editing interface for components selected in the design view editing mode. Both code hinting 309 and tag inspector 310 are component interfaces that use a library of tag informations in tag info 308 to populate the hinting portions offered by code hinting 309 and the editing interface offered by tag inspector 310. Component handler 300 strips out classes 303 and component schema 304 from CAR 301 for processing by tag info generator 307. Tag info generator 307 reads through component schema 304 and classes 303 to and generates the tag info files stored in tag info 308. As noted above, tag infos contain a wealth of information that describes the use and operation of the underlying component. Therefore, as a developer is operating in the code view editing mode of UI 312, application development environment 30 will execute the logic of code hinting 309, which pulls the tag informations from tag info 308 corresponding to the components that potentially match the code being entered by the developer and populates the code hinting interface displayed on UI 312 with those tags corresponding to the potentially matching components.

Similarly, when the developer is operating in the design view editing mode of UI 312, application development environment 30 executes the logic of tag inspector 310, which pulls the tag information from tag info 308 corresponding the component that the developer has selected on UI 312. The logic of tag inspector 310 populates the tag inspector interface on UI 312 with the appropriate tags, properties, and property editing tools that are defined in the tag info supporting the selected component.

It should be noted that in additional and/or alternative embodiments of the present invention, component handler 300 includes logic that monitors the components and component archives arriving from remote server 103 and automatically repopulates dynamic array 311 of insert bar 306, and tag info 308 with the new, modified, or deleted components. Therefore, the developer is not required to restart application development environment 30 to implement new or changed component groups.

Additional and/or alternative embodiments of the present invention may be implemented in application development environments directed to the development of Rich Internet Applications (RIAs). An example of such an application development environment is MACROMEDIA INC.'S FLEX BUILDER™. The additional and/or alternative embodiments of the present invention are not limited to operation in the FLEX BUILDER™ development environment, but may be used in various other application development environments. FLEX BUILDER™ is a development environment utilizing server-side code that assists in developing rich RIAs for application with MACROMEDIA INC.'s FLEX™. FLEX™ is a presentation server that delivers standards-based runtime services for deploying the presentation tier of rich client applications developed in MACROMEDIA, INC.'s MXML™. MXML™ is a specialized, XML-based language for developing RIAs and is native to the FLEX BUILDER™ development environment. It allows definition of the final appearance of an application's user interface without specifying a time-based sequence of steps for constructing that interface, but also includes availability of program logic, delivered by ACTIONSCRIPT™, or the like, within the declarative MXML™ statements. The FLEX™ server utilizes an interactive multimedia runtime container (iMRC), specifically a MACROMEDIA FLASH™ player, as a container for delivering the rich media applications to a client. FLEX BUILDER™ also uses an iMRC, specifically a MACROMEDIA FLASH™ player, to deliver its design view editing canvas or surface to the developer.

The FLEX™ server is essentially a Web Archive (WAR) file deployed on an application server, such as SUN MICROSYSTEM INC.'s JAVA 2 ENTERPRISE EDITION™ (J2EE™) server. The FLEX™ server includes a compiler that uses MXML™ and ACTIONSCRIPT™ files along with a set of built-in components and converts the files into SWF movie files that run in a Web browser with the MACROMEDIA FLASH™ player. Thus, as the developer develops a RIA using MXML™, ACTIONSCRIPT™, and any built-in FLEX™ components, the compiler creates the SWF that operates the RIA. A user would then use a particular Uniform Resource Locator (URL) request in a Web browser to access the RIA SWF.

Because FLEX BUILDER™ is a development environment capable of developing Internet applications, the resulting application may be deployed on some Internet-accessible server. Developers may have several different applications under development at any given time. Moreover, depending on the purpose of the given RIA or Internet application, components that are particularly suited for one application may not be suited for other applications. As the developer gathers various components, the component interfaces for the application development environments may become cluttered with various components and component groups, many of which may only be useful for one or two specific applications.

It should be noted that in additional and/or alternative embodiments of the present invention, components may be associated with a particular application under development corresponding to a location of the server where the final application will be deployed. Therefore, when the developer switches focus from one application to another within the application development environment, the component interface elements will repopulate with the components associated with that application.

In commercial application development, multiple developers typically work together in a development team with multiple persons working on the same application. As one developer creates new components that are applicable to the application, he or she may store the component archive on the server site that each developer may access either over the Internet or through a local area network (LAN), file transfer protocol (FTP), or the like. One developer starting up the application for editing will cause the application development environment to access the server site for component updates. Therefore, each of the developers on the development team may have access to all of the components.

In an application development environment, such as FLEX BUILDER™, the FLEX™ sites have a site definition associated with it, such that FLEX BUILDER™ searches the site definition to find the location of the server location. A configuration file is, thereby, maintained for the application. The configuration file contains the different class paths for the application components. The application development environment uses these class paths, while accessing the server location to find the areas on the server that contains the defined component groups. In the FLEX™ and FLEX BUILDER™ environments, components may be represented as SWC files, MXML™, and/or ACTIONSCRIPT™. Therefore, the application development environment would download all such SWC, MXML™, and/or ACTIONSCRIPT™ files it locates at the various class paths on the server.

Figure 4:
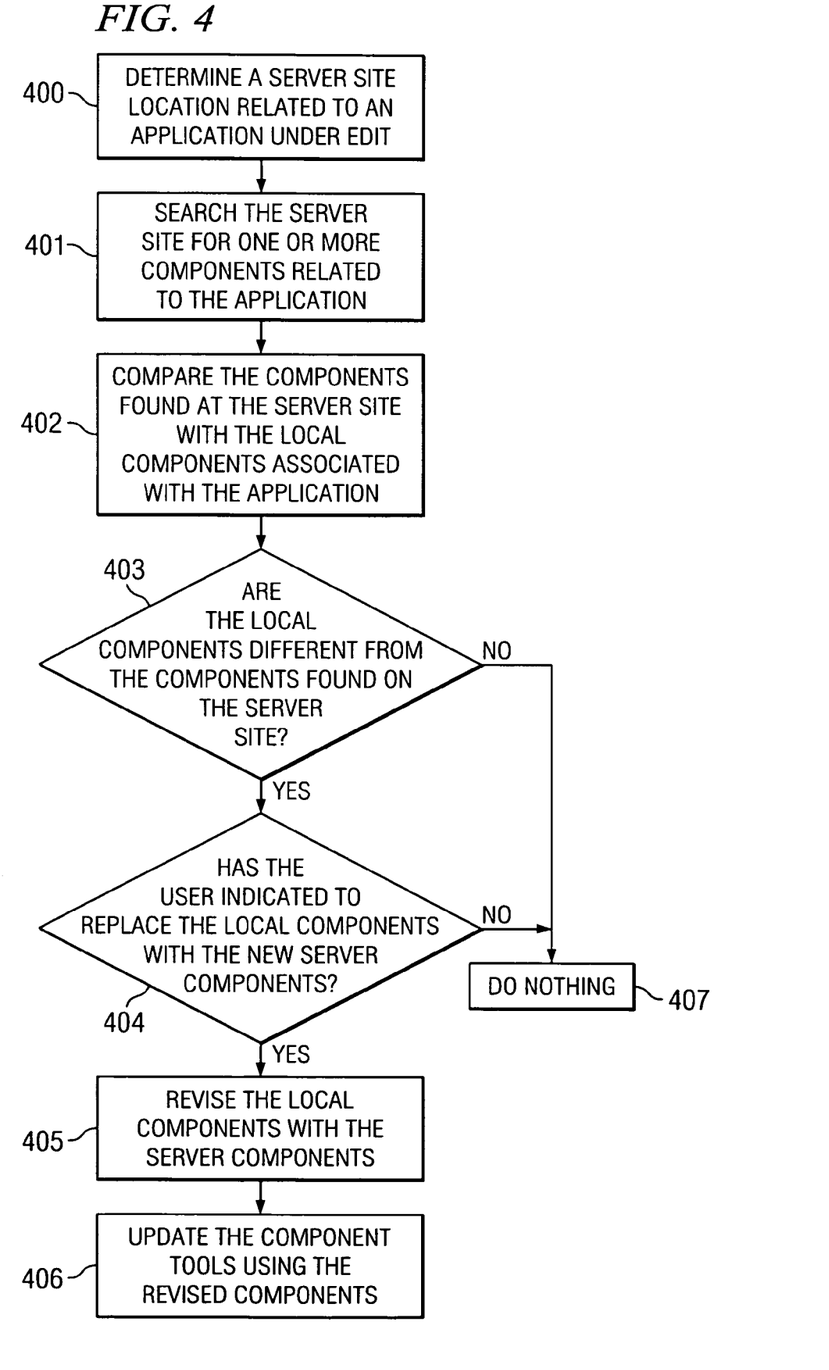
FIG. 4 is a flowchart illustrating example steps executed to implement one embodiment of the present invention.

FIG. 4 is a flowchart illustrating example steps executed to implement one embodiment of the present invention. In step 400, a server site location related to an application under edit is determined by the application development environment. The application development environment searches a class path of the server site, in step 401, for one or more components related to the application. The components found at the server site are then compared with the local components associated with the application in step 402. If the local components are found to be different from the components found on the server site, in step 403, a user is requested whether or not the local components should be replaced by the new server components, in step 404. If there is no difference in the components, nothing is done, in step 407. If the user selects to do so, the local components are revised, in step 405, with the server components that are different. Any component tools are then updated, in step 406, using the revised ones of the components. The user may select, in step 404, not to update the components, in which case, nothing is done, in step 407.

It should be noted that although examples of the various embodiments of the present invention have been described using the details of specific application development environments, such as FLEX BUILDER™, DREAMWEAVER™, FLASH MX™, and the like, the additional and/or alternative embodiments of the present invention may be implemented using any type of application development environment that utilizes components in its programming environment. In addition to the specific examples from MACROMEDIA INC., additional example application development environments may include BORLAND SOFTWARE CORPORATION's DELPHI™, JBUILDER™, MICROSOFT CORPORATION's FRONTPAGE™, ADOBE SYSTEMS INC.'s GO LIVE™, or the like. The various embodiments of the present invention are not limited to specific examples of such application development environments.

Figure 5:
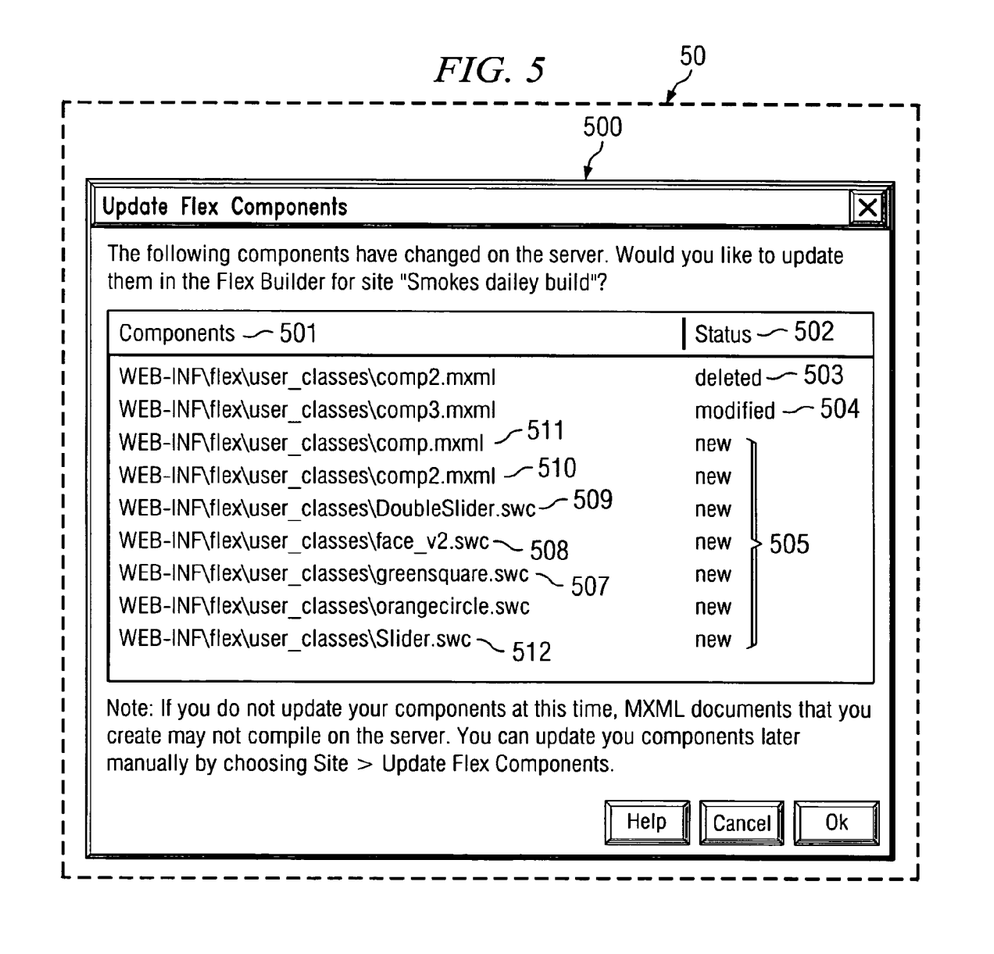
FIG. 5 is a screenshot illustrating a component update dialog box of an application development environment configured according to another embodiment of the present invention.

FIG. 5 is a screenshot illustrating component update dialog 500 of application development environment 50 configured according to another embodiment of the present invention. In operation, a developer opens an application file to edit in application development environment 50. Application development environment 50 determines the location of the server that is or will be associated with the application under edit and accesses the server site. Application development environment 50 searches the class path for any components and downloads those components to the developer's local computer. It then compares those components downloaded from the server site to the components resident on the developer's local computer. If any of the downloaded components are different than the local components, application development environment 50 presents component update dialog 500 to the developer.

Component update dialog 500 presents each of the downloaded components to the developer by name 501 and status 502. Component 503 is shown to the developer as being deleted from the group of components associated with the application under edit. Component 504 is shown to be modified, while components 505, including components 507-512, are each new. The developer may then select OK button 506 to update the local components with the components downloaded from the server site connected with the application under edit.

When the user of an application development environment, such as FLEX BUILDER™, chooses to update the local components with the components downloaded from the server, FLEX BUILDER™ uses a command line tool to convert any MXML™ and ACTIONSCRIPT™ components into SWC files. Each of the SWC files is then read in order to create an internal representation of the component tags, attributes, class names, and the like. FLEX BUILDER™ then generates an MXML™ file from the internal representations that includes an instance of each of the components that are being updated. Once the MXML™ file has been created, with each instance of every component, another command line tool converts this MXML™ file into a SWF, thus, packaging all of the downloaded/updated components into a single file, such as a SWF file, that contains compiled executable code that may render the components in a design view canvas or surface. An application programming environment, such as FLEX BUILDER™, may provide a default name for such a SWF file that contains all of the updated components. This single component file, the SWF file in this example, may then be loaded by the design view canvas or surface in order to render instances of component which may then be directly manipulated by a developer.

Figure 6:
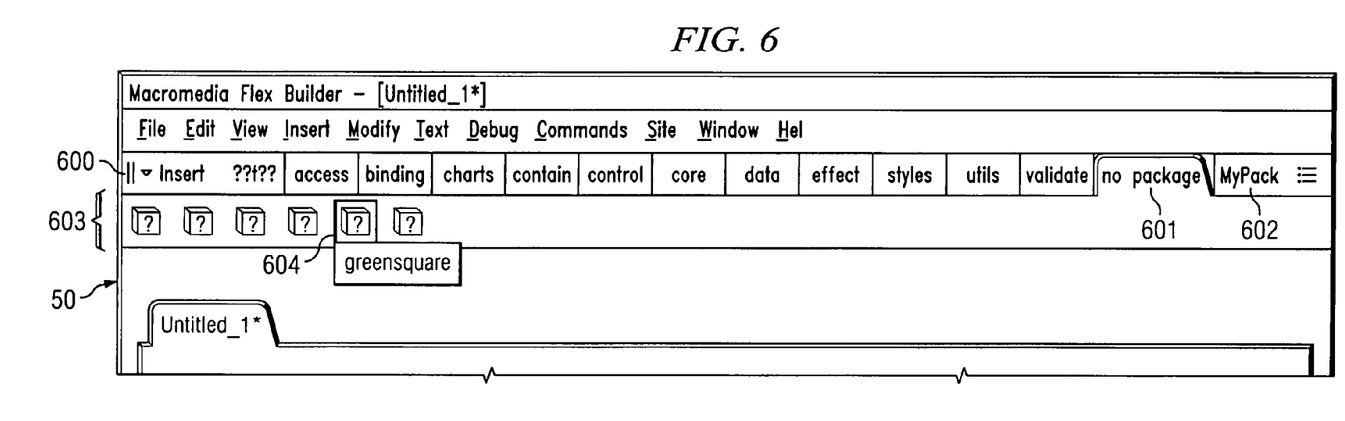
FIG. 6 is a screenshot illustrating an application development environment configured according to another embodiment of the present invention.

FIG. 6 is a screenshot illustrating application development environment 50 configured according to another embodiment of the present invention. When the developer selects to install and update the components from the server site, the components are installed into insert bar 600. The components available with the application under edit in application development environment 50 are grouped into tabbed sections, such as no package tab group 601 and myPackage tab group 602. The current tabbed group, no package tab group 601, displays icons 603 that represent the components in the component group. For example, greensquare icon 604 corresponds to greensquare component 507 (FIG. 5) that was updated from the server site.

Figure 7:
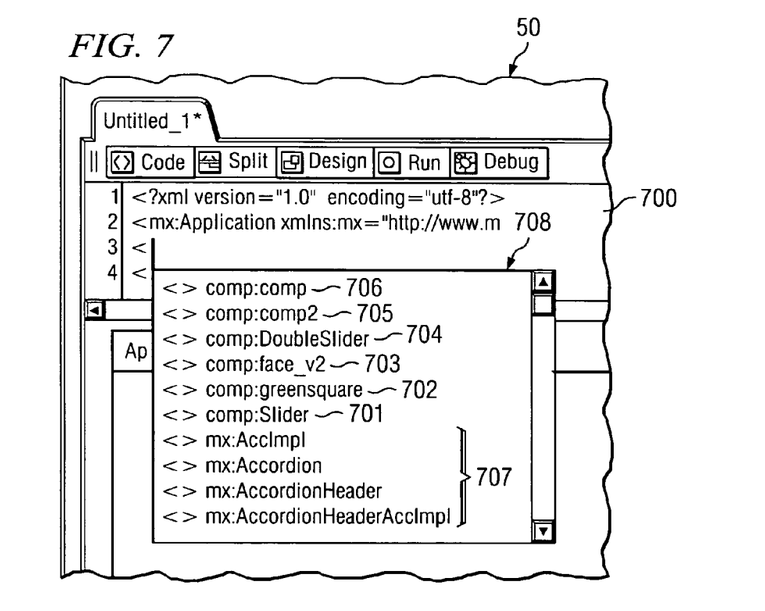
FIG. 7 is a screenshot illustrating an application development environment configured according to another embodiment of the present invention displaying a code hinting dialog box.

FIG. 7 is a screenshot illustrating application development environment 50 configured according to another embodiment of the present invention displaying code hinting box 708. The components updated from the server site associated with the application under edit are also used to populate the code hinting feature of application development environment 50. When the developer is working in code view 700 editing mode and begins typing a line of script with an open bracket '<', code hinting box 708 pops up to the developer with a list of all of the available components. Code hinting box 708 includes the components from the server site, such as components Slider 701, which corresponds to updated component 512 (FIG. 5), greensquare 702, which corresponds to updated component 507 (FIG. 5), face_v2 703, which corresponds to updated component 508 (FIG. 5), DoubleSlider 704, which corresponds to updated component 508 (FIG. 5), comp2 705, which corresponds to updated component 510 (FIG. 5), comp 706, which corresponds to updated component 511 (FIG. 5), and built-in components 707. Thus, instead of typing the entire component tag, the developer may select the desired tag directly from code hinting box 708, which will then automatically be copied into the code segment.

Figure 8A:
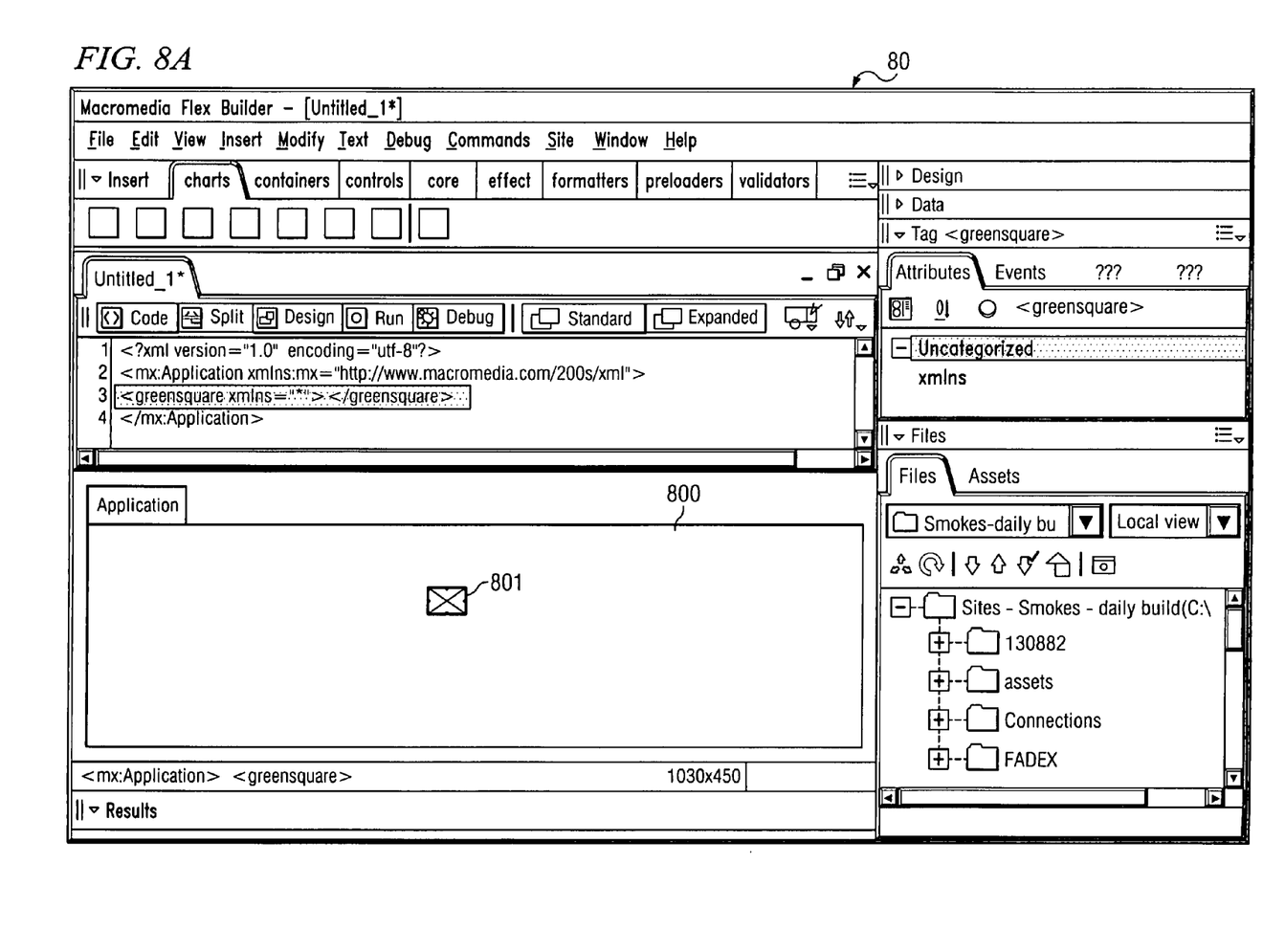
FIG. 8A is a screenshot illustrating an application development environment configured according to another embodiment of the present invention having a design view editing mode.

FIG. 8A is a screenshot illustrating application development environment 80 configured according to another embodiment of the present invention having design view surface 800. In application development environments, such as FLEX BUILDER™, that use iMRC to display or implement the design view editing environment, a media file compatible with the iMRC is generated and played on the iMRC when the application development environment is in a design view editing mode. Application development environment 80 is such an application development environment, for example FLEX BUILDER™. Design view surface 800 is a media or electronic file played on the instance of the iMRC that is presenting the design view editing mode to a developer using application development environment 80. When a user attempts to place user component 801 onto design view surface 800 without first updating the components, design view surface 800 cannot display the component as the user intends. This is because the media file, the SWF file in the case of the FLEX BUILDER™ development environment, that represents the design view does not include any representation of the new component. Therefore, user component 801 is displayed on design view surface 800 as an undefined component.

Figure 8B:
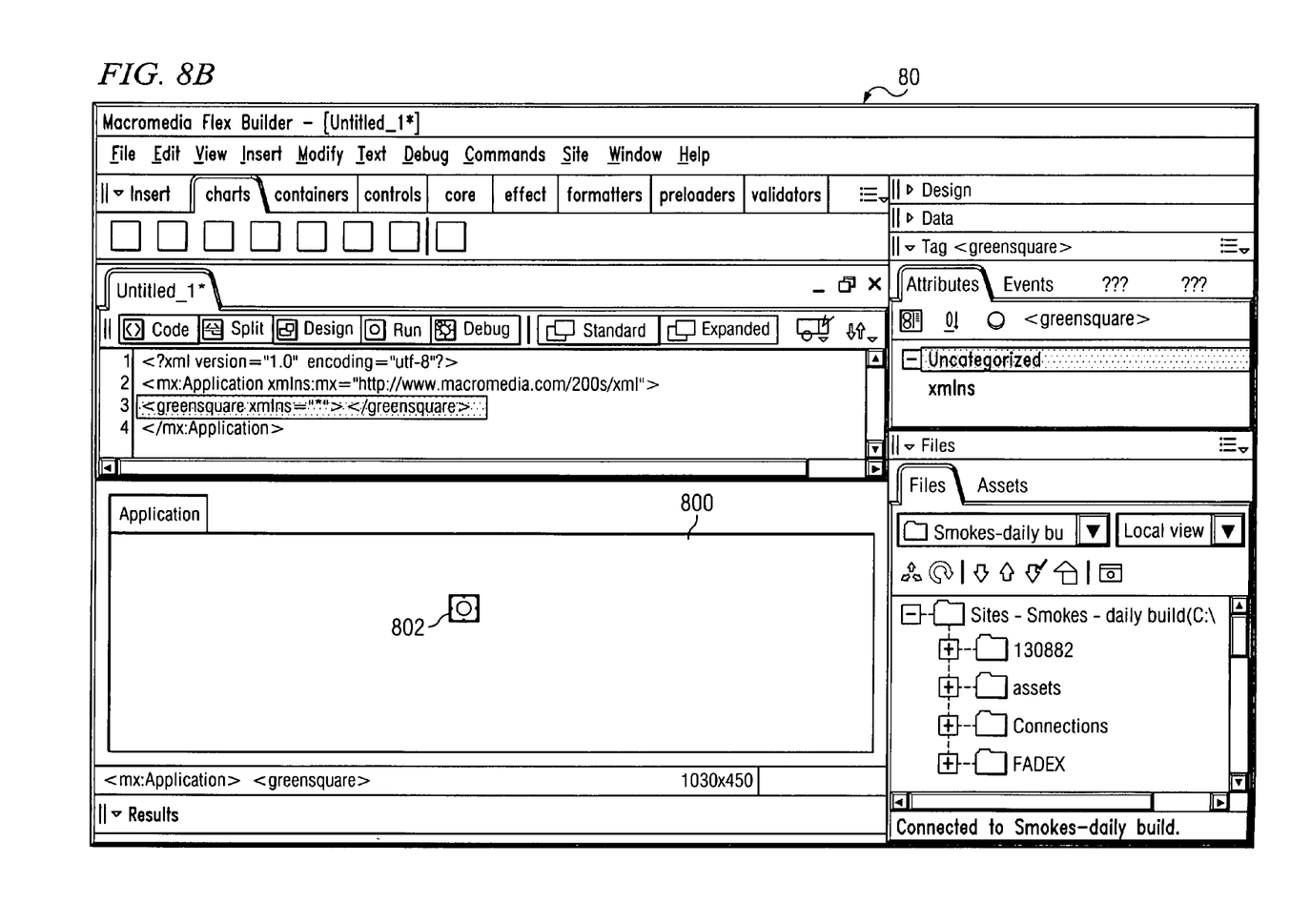
FIG. 8B is a screenshot illustrating an application development environment configured according to another embodiment of the present invention having a design view editing mode after updating components.

FIG. 8B is a screenshot illustrating application development environment 80 configured according to another embodiment of the present invention showing design view surface 800 after updating components. Once the components have been updated, application development environment 80 re-compiles the media file that represents the design view editing mode. This re-compiled media file includes component executable 313 (FIG. 3) from the component archive that instructs the iMRC displaying design view surface 800 how to display and manipulate instances of user component 802 as the developing user intended. Therefore, after updating the components, a developer operating in design view surface 800 is able to place the updated components, including user component 802, onto design view surface 800 as the developing user intended the updated components to appear and operate.

Figure 9:
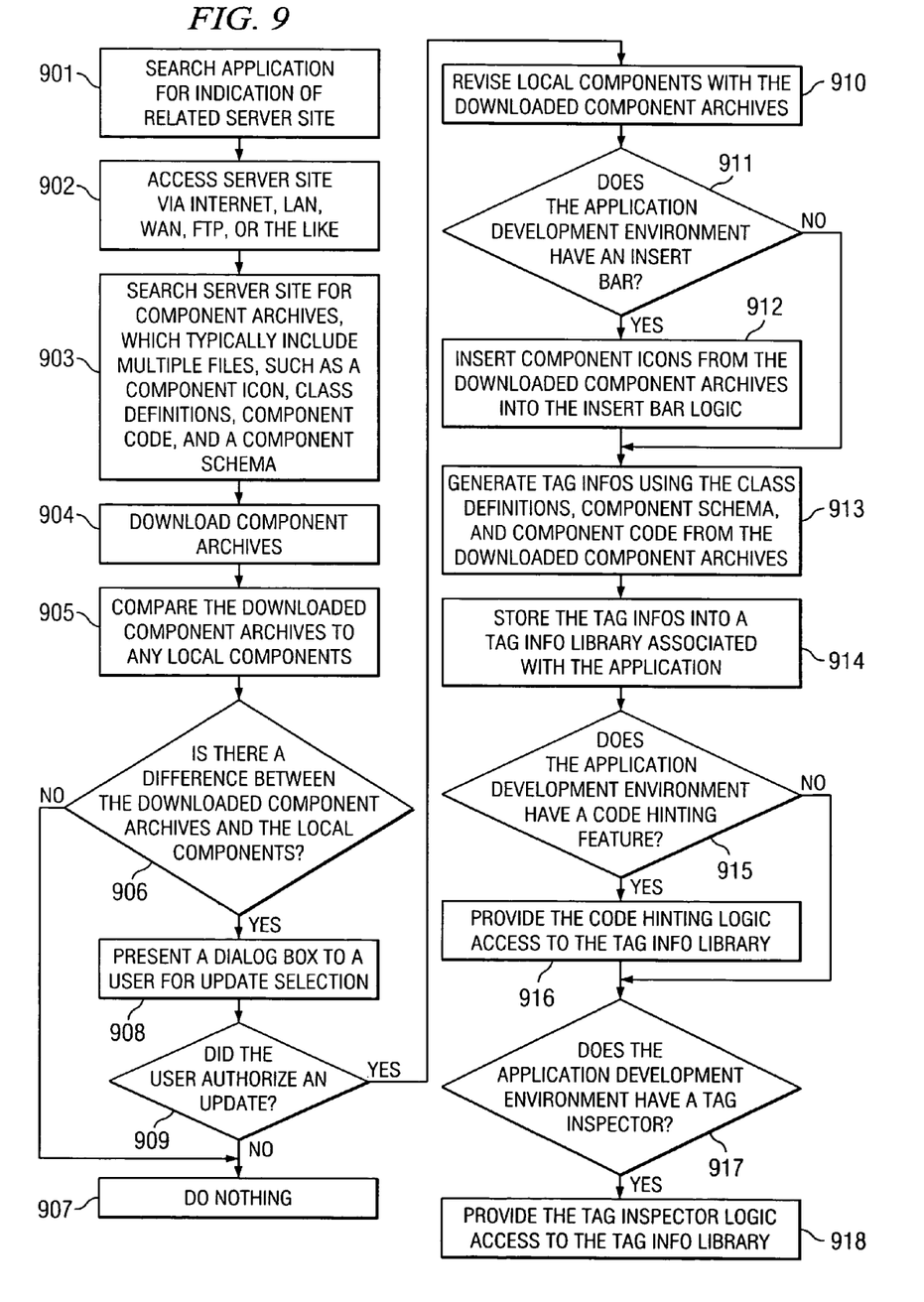
FIG. 9 is a flowchart illustrating example steps executed to implement one embodiment of the present invention.

FIG. 9 is a flowchart illustrating example steps executed to implement one embodiment of the present invention. In step 901, the application development environment searches an application for indication of related server site. The server site is then accessed, in step 902, via Internet, LAN, WAN, FTP, or the like. In step 903, the server site is searched for component archives, which typically include multiple files, such as a component icon, class definitions, component code, and a component schema. Component archives that are found are then downloaded, in step 904. The application development environment compares the downloaded component archives to any local components, in step 905. A determination is made in step 906 whether there a difference between the downloaded component archives and the local components. If no difference is detected, no further action is taken, in step 907, with regard to the downloaded component archives.

If a difference is detected in step 906, a dialog box is presented, in step 908, to a user for update selection. The application development environment determines, in step 909, whether the user authorizes an update. If the user does not authorize an update, no further action is taken, in step 907. However, if the user authorizes such an update, in step 910, the local components are revised with the downloaded component archives. Once revised, the application development environment begins updating any component interfaces or component tools.

In step 911, a determination is made whether the application development environment has an insert bar. If an insert bar does exist, component icons from the downloaded component archives are inserted, in step 912, into the insert bar logic. In addition, tag infos are generated, in step 913, using the class definitions, component schema, and component code from the downloaded component archives. These tag infos are then stored into a tag info library associated with the application in step 914 A determination is made, in step 915, whether the application development environment has a code hinting feature. If so, then the code hinting logic is provided access to the tag info library in step 916. A determination is also made, in step 917, whether the application development environment has a tag inspector. If so, then the tag inspector logic is provided access to the tag info library in step 918.

The program or code segments making up the various embodiments of the present invention may be stored in a computer readable medium or transmitted by a computer data signal embodied in a carrier wave, or a signal modulated by a carrier, over a transmission medium. The "computer readable medium" may include any medium that can store or transfer information. Examples of the computer readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, and the like. The computer data signal may include any signal that can propagate over a transmission medium such as electronic network channels, optical fibers, air, electromagnetic, RF links, and the like. The code segments may be downloaded via computer networks such as the Internet, Intranet, and the like.

Figure 10:
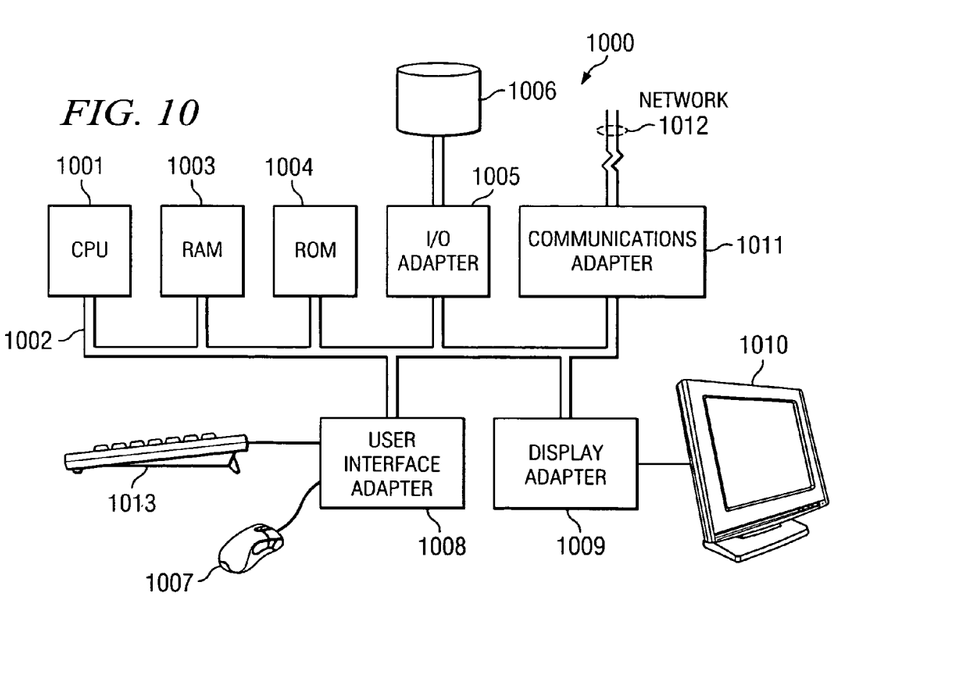
FIG. 10 illustrates a computer system adapted to use embodiments of the present invention.

FIG. 10 illustrates computer system 1000 adapted to use embodiments of the present invention, e.g. storing and/or executing software associated with the embodiments. Central processing unit (CPU) 1001 is coupled to system bus 1002. The CPU 1001 may be any general purpose CPU. However, embodiments of the present invention are not restricted by the architecture of CPU 1001 as long as CPU 1001 supports the inventive operations as described herein. Bus 1002 is coupled to random access memory (RAM) 1003, which may be SRAM, DRAM, or SDRAM. ROM 1004 is also coupled to bus 1002, which may be PROM, EPROM, or EEPROM. RAM 1003 and ROM 1004 hold user and system data and programs as is well known in the art.

Bus 1002 is also coupled to input/output (I/O) controller card 1005, communications adapter card 1011, user interface card 1008, and display card 1009. The I/O adapter card 1005 connects storage devices 1006, such as one or more of a hard drive, a CD drive, a floppy disk drive, a tape drive, to computer system 1000. The I/O adapter 1005 is also connected to a printer (not shown), which would allow the system to print paper copies of information such as documents, photographs, articles, etcetera. Note that the printer may be a printer (e.g. dot matrix, laser, etcetera.), a fax machine, scanner, or a copier machine. Communications card 1011 is adapted to couple the computer system 1000 to a network 1012, which may be one or more of a telephone network, a local (LAN) and/or a wide-area (WAN) network, an Ethernet network, and/or the Internet network. User interface card 1008 couples user input devices, such as keyboard 1013, pointing device 1007, etcetera to the computer system 1000. The display card 1009 is driven by CPU 1001 to control the display on display device 1010.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A computer implemented method comprising:
    receiving, from a user, input selecting an application for editing in an application development environment, the application development environment having one or more component tools for utilizing a set of local components to edit applications; and
    in response to receiving the input selecting the application for editing:
    identifying, by the application development environment, one or more components associated with the application selected for editing;
    determining, by the application development environment, a server site deploying the identified one or more components associated with the application selected for editing;
    in response to identifying and determining, searching, by the application development environment, said server site for the identified one or more components;
    comparing, by the application development environment, one or more components found in response to searching with the set of local components;
    revising, by the application development environment, the set of local components responsive to said comparing; and
    updating, by the application development environment, said one or more component tools using said revised set of local components.

2. The method of claim 1 wherein said server site is a remote server.

3. The method of claim 1 wherein said searching comprises searching a class path of said server site.

4. The method of claim 3 further comprising:
    uploading one or more user-created components to said class path of said server site.

5. The method of claim 1 wherein the one or more components associated with the application selected for editing comprise:
    a component icon;
    a component class definition;
    component code;
    a component executable; or
    a component schema.

6. The method of claim 1 further comprising:
    saving a copy of the set of local components prior to said revising.

7. The method of claim 1 wherein said one or more component tools comprise one or more of:
    a toolbar;
    a code-hinting tool
    a design view canvas; and
    a code inspector.

8. The method of claim 7 wherein said one or more component tool comprises said toolbar, said updating comprising:
    inserting one or more buttons on said toolbar, wherein said buttons correspond to said revised ones of said one or more local components; and
    adding logic executable responsive to selection of said one or more buttons for introducing said corresponding revised ones of said one or more local components into said application selected for editing.

9. The method of claim 7 wherein said one or more component tools comprises one of said code-hinting tool and said code inspector, said updating comprising:
    inserting one or more tag informations corresponding to said revised ones of said one or more local components into a tag library, wherein said tag library is accessible by said code-hinting tool and said code inspector.

10. The method of claim 9 wherein said one or more tag informations comprise:
a list of attributes associated with revised ones of said one or more local components;
a list of attribute types for said list of attributes; and
a set of possible values for each one of said list of attributes.

11. The method of claim 7 wherein said one or more component tools comprises said design view canvas, said updating comprising:
re-compiling one or more media files defining said design view canvas using said revised one or more local components.

12. The method of claim 1 further comprising:
presenting a selection option to a user prior to said revising, wherein said revising is performed responsive to an authorization option selected by said user.

13. The method set forth in claim 1, wherein determining, searching, comparing, and updating occur in response to a change of focus between a first application selected for editing and a second application selected for editing in the application development environment.

14. A computer implemented method comprising:
receiving, from a user, input selecting an application for editing in an application development environment, the application development environment comprising a plurality of component tools for use while editing, the component tools generated for use in editing applications by using a set of local components;
providing an interface for editing the application selected for editing;
identifying, by the application development environment, a subset of the set of local components including components associated with the application selected for editing;
searching for a component archive comprising corresponding versions of components of the identified subset;
comparing corresponding versions of the components located in said component archive found in response to searching with components of the identified subset;
updating said components of the identified subset with said corresponding versions of the components from said component archive responsive to said comparing; and
revising the component tools using said updated components of the identified subset.

15. The method of claim 14 further comprising:
determining a location for said component archive prior to said searching.

16. The method of claim 15 wherein said location comprises a class path of a remote server.

17. The method of claim 15 further comprising:
creating a custom component;
generating a custom component archive from said custom component; and
storing said custom component archive to said location.

18. The method of claim 14 wherein said component archive comprises one or more of:
an icon;
a class definition;
component code;
a schema; and
a component executable.

19. The method of claim 14 further comprising:
storing a copy of said set prior to said updating.

20. The method of claim 14 wherein said one or more component tools comprise one or more of:

a component toolbar;
a code-hinting feature;
a tag inspector; and
a design view surface.

21. The method of claim 20 wherein said one or more component tools comprises said toolbar, said updating comprising:
inserting one or more buttons on said toolbar, wherein said buttons correspond to said updated set of local components; and
adding logic executable responsive to selection of said one or more buttons for introducing corresponding ones of said updated set of local components into said application selected for editing.

22. The method of claim 20 wherein said one or more component tools comprises one of said code-hinting tool and said code inspector, said updating comprising:
inserting one or more tag informations corresponding to said updated set of local components into a tag library, wherein said tag library is accessible by said code-hinting tool and said code inspector.

23. The method of claim 22 wherein said one or more tag informations comprise one or more of:
a list of attributes associated with said updated set of local components;
a list of attribute types for said list of attributes; and
a set of possible values for each one of said list of attributes.

24. The method of claim 20 wherein said one or more component tools comprises said design view surface, said revising comprising:
re-compiling one or more electronic files defining said design view surface using said updated set of local components.

25. The method of claim 14 further comprising:
requesting authorization to update from a user prior to said updating, wherein said updating is performed responsive to authorization of said user.

26. A computer program product having a computer readable storage medium with computer program logic recorded thereon, the computer program product comprising:
code for receiving input from a user, the input identifying an application selected for editing in an application development environment;
code for determining, in response to the received input, a server to be searched by the application development environment to locate component archives, wherein the server to be searched is determined based upon the application selected for editing;
code for searching said server for one or more component archives comprising a component of said application selected for editing;
code for comparing said one or more component archives with one or more local components associated with said application selected for editing;
code for revising said one or more local components with said one or more component archives responsive to results of executing said code for comparing; and
code for updating at least one component interface of the application development environment using said revised one or more local components.

27. The computer program product of claim 26 wherein said server is a remote server.

28. The computer program product of claim 26 wherein said code for searching comprises code for searching a class path of said server.

29. The computer program product of claim 26 wherein each one of said one or more component archives comprise one or more of:
    a button icon;
    a component class definition;
    component code;
    a component executable; and
    a component schema.

30. The computer program product of claim 26 further comprising: code for saving a copy of said one or more local components prior to execution of said code for revising.

31. The computer program product of claim 26 further comprising: code for uploading one or more user-created component archives to said server.

32. The computer program product of claim 26 wherein said at least one component interface comprises one or more of: an insert bar; a code-hinting tool; a design view surface; and a tag inspector.

33. The computer program product of claim 32 wherein said at least one component interface comprises said insert bar, said code for updating comprises:
    code for inserting one or more button icons on said insert bar, wherein said one or more button icons correspond to said revised one or more local components; and
    code for adding logic, executable responsive to selection of said one or more button icons, for introducing said corresponding revised one or more local components into said application selected for editing.

34. The computer program product of claim 32 wherein said at least one component interface comprises one of said code-hinting tool and said tag inspector, said code for updating comprising:
    code for inserting one or more tag informations corresponding to said revised one or more local components into a tag library, wherein said tag library is accessible by at least one of said code-hinting tool and said tag inspector.

35. The computer program product of claim 34 wherein said one or more tag informations comprise at least one of:
    a list of attributes associated with revised ones of said one or more local components;
    a list of attribute types for said list of attributes; and
    a set of possible values for each one of said list of attributes.

36. The computer program product of claim 34 further comprising: code for generating said one or more tag informations using said one or more component archives.

37. The computer program product of claim 32 wherein said at least one component interface comprises said design view surface, said revising comprising
    re-compiling one or more electronic files defining said design view surface using said revised one or more local components.

38. The computer program product of claim 26 further comprising:
    code for presenting a selection option to a user for said revising, wherein said code for revising is executed responsive to said selection option entered by said user.

39. A computer-implemented method comprising:
    identifying, by an application development environment provided using a computing system, a set of locally-accessible components stored in a computer-readable medium;
    generating a plurality of component tools, the component tools comprising interface elements for use in manipulating application components via the application development environment;
    receiving input from a user, the input selecting an application for editing using the application development environment;
    in response to the input selecting the application for editing, determining a second location, the second location known to store a component of the application selected for editing;
    in response to the input selecting the application for editing, searching the second location for at least one stored component of the application selected for editing;
    comparing the at least one stored component to the set of locally-accessible components;
    updating the set of locally-accessible components based on comparing; and
    updating the component tools based on the updated set of locally-accessible components.

40. The computer-implemented method set forth in claim 39, wherein the second location comprises a server remote to the computing system providing the application development environment.

41. The computer-implemented method set forth in claim 39, wherein updating the component tools comprises adding at least one component tool and removing at least one component tool.

42. The computer-implemented method set forth in claim 41, wherein the received input from a user comprises input changing focus from a first application to a second application,
    wherein the added component tool comprises a tool for a component associated with the second application but not the first application, and
    wherein the removed component tool comprises a tool for a component associated with the first application but not the second application.

43. The computer-implemented method set forth in claim 39, further comprising:
    updating a library of tag information based on the updated set of locally-accessible components.

* * * * *